United States Patent [19]

Nakagawa et al.

[11] 4,385,027
[45] May 24, 1983

[54] METHOD AND DEVICE FOR UNLOADING OF TIRE FROM A TIRE VULCANIZER

[75] Inventors: Kazuhiko Nakagawa, Kobe; Yasuhiko Fujieda, Akashi, both of Japan

[73] Assignee: Kobe Steel, Ltd., Kobe, Japan

[21] Appl. No.: 156,256

[22] Filed: Jun. 3, 1980

[51] Int. Cl.³ .............................................. B29H 5/02
[52] U.S. Cl. ...................................... 264/334; 425/38
[58] Field of Search ............................ 425/31, 32, 38; 264/334

[56] References Cited

U.S. PATENT DOCUMENTS

| | | | |
|---|---|---|---|
| 3,141,191 | 7/1964 | Soderquist | 425/38 |
| 3,222,716 | 12/1965 | Harris | 425/31 |
| 3,336,630 | 8/1967 | Soderquist | 425/38 |
| 3,530,533 | 9/1970 | Turk et al. | 425/32 |
| 3,685,929 | 8/1972 | Yoshida et al. | 425/38 |
| 4,013,186 | 3/1977 | Barton et al. | 425/38 X |

FOREIGN PATENT DOCUMENTS 517338 7/1981 Australia .
964363 7/1964 United Kingdom .................. 425/38

Primary Examiner—J. Howard Flint, Jr.
Attorney, Agent, or Firm—Oblon, Fisher, Spivak, McClelland & Maier

[57] ABSTRACT

A method and apparatus for unloading a tire from a tire vulcanizer wherein following the vulcanization of the tire within upper and lower molds the tires withdrawn from a bladder through tire support arms travelling in a given trajectory and is then transferred on to a device which in turn conveys the tire to the next succeeding step, the method utilized in accordance with the apparatus including the steps of forwarding the tire support arms in a horizontal direction to correspond to sides of the bottom of the tire to be removed, elevating the arms in a vertical direction together with the tire for removing the tire therefrom and transfering the tire onto the conveying device via a path different from that for the forwarding arms while the tire is being held in a horizontal position.

5 Claims, 6 Drawing Figures

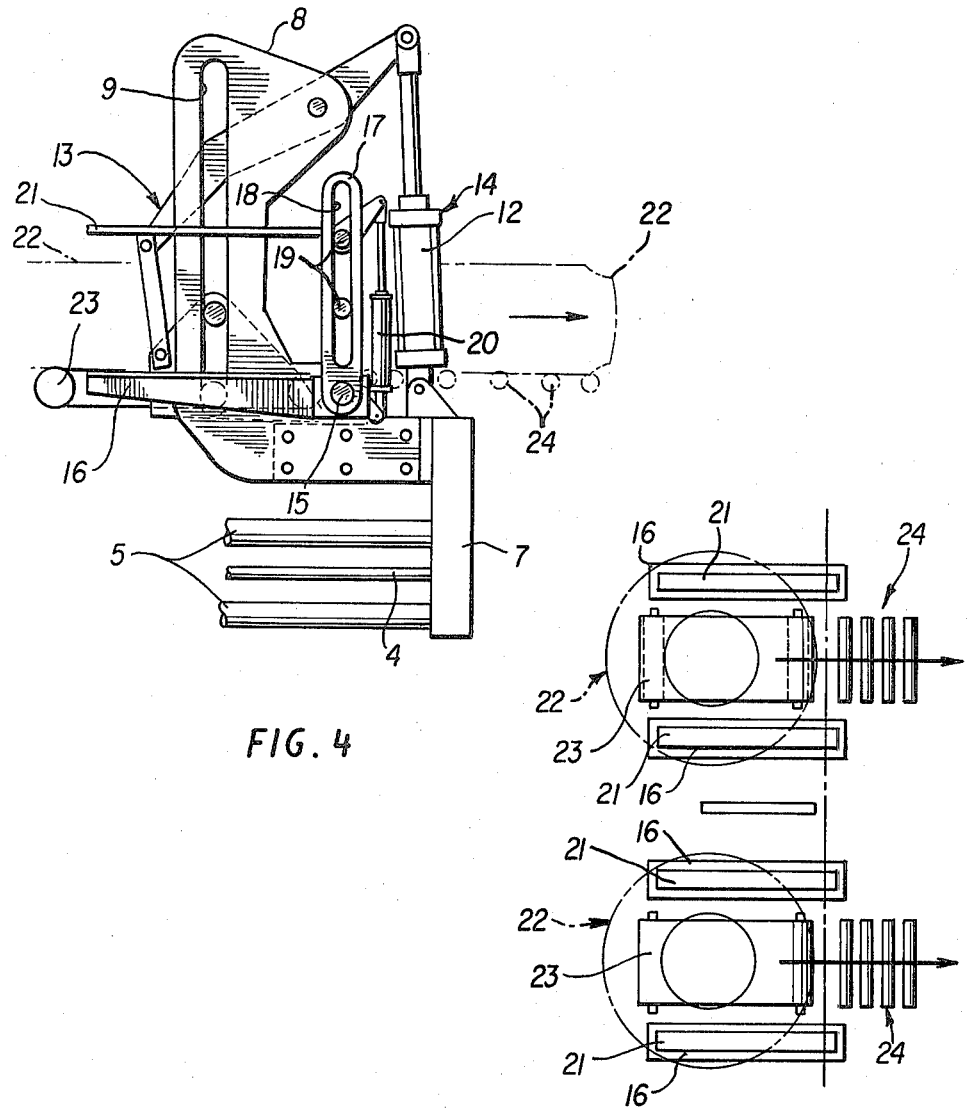
FIG. 4
FIG. 5
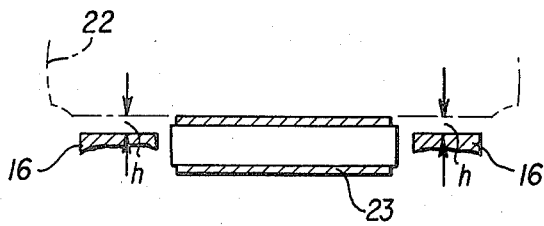
FIG. 6

METHOD AND DEVICE FOR UNLOADING OF TIRE FROM A TIRE VULCANIZER

BACKGROUND OF THE INVENTION

1. Field of the Invention This invention relates to an improvement in method and device for unloading of tires from a tire vulcanizer, and more particularly an improved method and device which consistently holds a tire in a horizontal direction and reliably transfers the tire to a conveying position closer to a next step in withdrawing the tire after vulcanization, thus making sure transportation of the tire into a post inflator at the next step.

2. Description of the Prior Art

In a well known tire vulcanizer machine, a tire is elevated after vulcanization together with a bladder to move away from a lower mold and the bladder is then collapsed inward and extended in a vertical direction to facilitate unloading of the tire. In order to ensure complete unloading of the tire, a removing arm carrying only the tire thereon is further brought under the bottom thereof and then elevated to remove the tire from the bladder.

The time-honored way of completing the removal of the tire is to overturn backward the removing arm which is ascending in a horizontal position. In this manner the tire slides downward on the arm to rest on a roller conveyer and advances in that condition toward the post inflator.

However, prevailing radial tires have been more and more lightweight per se and the pursuit of the above-mentioned conventional method with those tires results in the fact that the tire would deviate readily from its desired trajectory on the roller conveyer and become quite unstable before reaching the next step. Such an objectionable situation is difficult to correct at the post inflator.

SUMMARY OF THE INVENTION

With the foregoing in mind, it is an object of the present invention to provide a method and a device for unloading of tires from a tire vulcanizer which ensures stable unloading of tires to facilitate design and construction of an automated processing step. Significant features of the present invention resides in a method for unloading a tire from a tire vulcanizer wherein following the vulcanization of the tire within upper and lower molds the tire is withdrawn from a bladder through tire support arms traveling in a given trajectory and is then transferred onto a device which in turn conveys the tire to the next succeeding step, such method including the steps forwarding the tire support arms in a horizontal direction to correspond to sides of the bottom of the tire to be removed, elevating the arms in a vertical direction together with the tire for removing the tire therefrom and transferring the tire onto the conveying device via a path different from that for the forwarding arms while the tire is being held in a horizontal position.

BRIEF DESCRIPTION OF THE DRAWINGS

FIG. 4 is a side view showing the tire conveying state of the device;

FIG. 5 is a plan view for explanation of the device, and

FIG. 6 is an elevational rear view showing the state where the tire is mounted on a conveyor.

Figure 1:
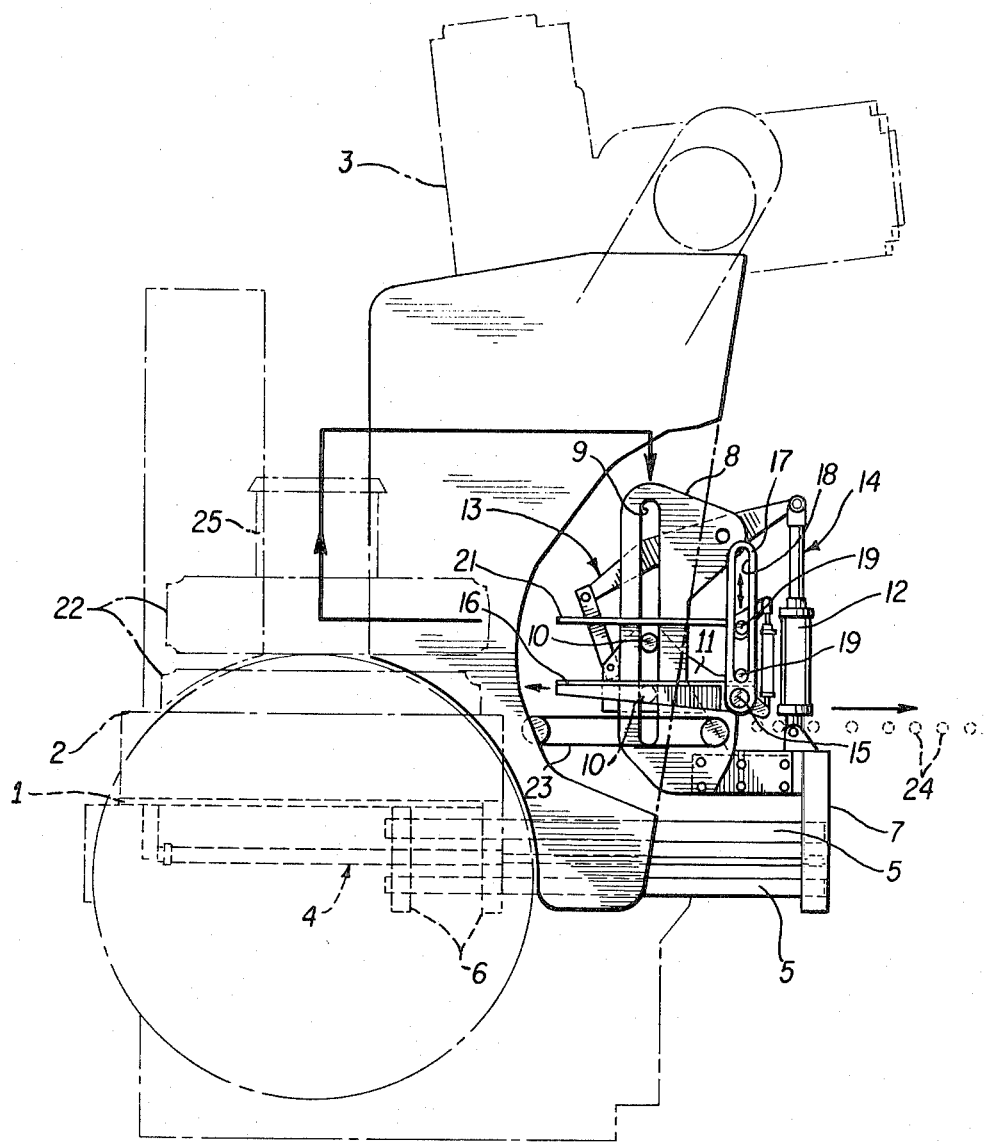
FIG. 1 is a side view of a tire removal device according to one embodiment of the present invention.

As is shown in FIG. 1, on a stationary frame is disposed a base (1) through which a lower mold (2) of the twin type is mounted while an upper mold (3) disposed in face-to-face relationship thereto is open as shown in FIG. 1.

A feeder (4) is provided in a horizontal direction via the base (1) and takes in the form of a cylinder with a backward oriented end. Guide bars (5), (5) are slidable on brackets (6), (6) and a support (7) is also movable at the rear ends of the bars (5) and the feeder (4).

As best shown in FIGS. 2 through 6, a main frame (8) of a generally "L" shaped side view extends from an upper end portion of the support (7) and has a guide slot (9) formed therein in a longitudinal direction.

The guide slot (9) is as long as possible along its height and upper and lower pairs of elevating rollers (10), (10) are provided to rotate freely within the guide slot, with a mountainlike elevating brackets (11) being elevated by way of the rollers (10), (10). In order to reciprocate elevating brackets (11), an elevating cylinder (12) is disposed adjacent support (7) and a pair of link members are disposed to extend between the cylinder (12) and the elevating bracket (11), thus constituting an elevator assembly (13). The above discussed arrangement is located between twin-fork type support arms as depicted in FIG. 5 such that the elevating bracket (11) is held in a horizontal position by virtue of the link scheme (13) and the two rollers (10), (10). An installation shaft (15) extending sideward is provided in a well known manner such as by the use of a key, etc., with the bracket (11) centering the same.

Two pairs of tire support arms (16) extending forward are disposed on the left and right sides of the installation shaft (15) and a pressure arm guide (17) is disposed in a different position on the installation shaft (15). Through a pair of rollers (19), (19) freely rotatable in a guide slot (18) formed in a guide (17) and a pressure cylinder (20), a tire pressure arm (21) capable of elevating itself extends forward in a horizontal direction. When viewing in a plan view, respective arms (21) confront the respective support arms (16) from above in a position to depress two left and right points of the tire (22) from above. A belt type conveyer (23) extends in a horizontal direction between the two adjacent support arms (16) with its height being higher than a lowest limit of the support arms (16), (16) by a height h as depicted in FIG. 6. It will be appreciated that the conveyer (23) is motor driven and normally located in the illustrated position. A conveyer (24) extends between the conveyer (23) and a post inflator.

With such an arrangement, the support arm (16) of a two-fork type is moveable in a horizontal direction behind each tire (22) and the pressure arm (21) is disposed in a face-to-face relationship with the arm from above as viewed in FIG. 1. Then, tire (22) along with the bladder (25) is elevated away from the lower mold (2) so that the bladder (25) itself shrinks but expands upward.

Figure 2:
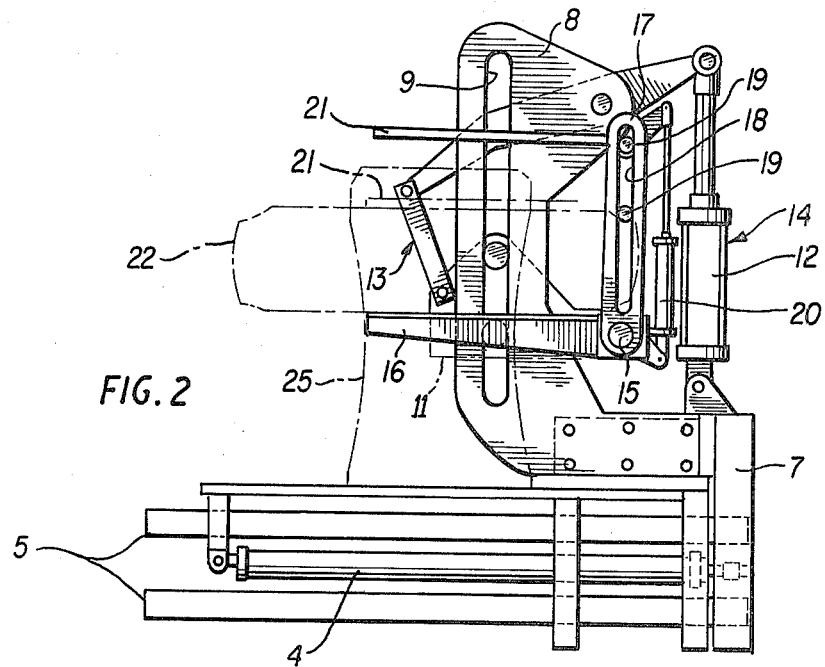
FIG. 2 is a side view showing the operating state of the device when a tire is removed.
Figure 3:
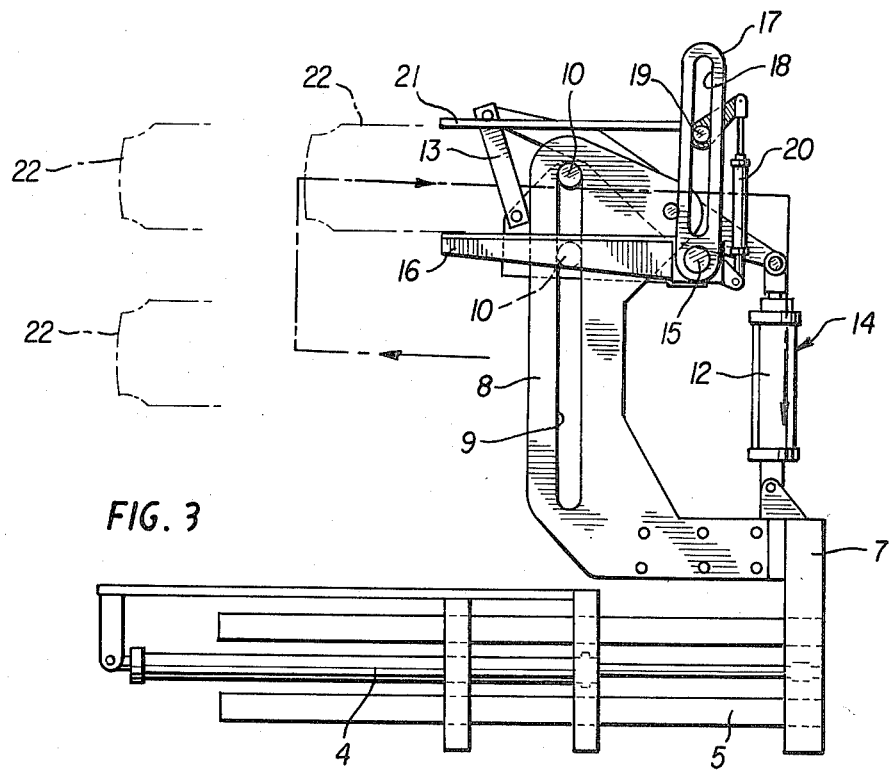
FIG. 3 is a side view showing the transferring state of the device after removal of the tire.

Upon subsequent operation of the feeder (4) the main frame (8) travels toward the center of the molds to hold the elevated tire (22) on both sides as depicted in FIG. 2. The pressure arm (21) is in an elevated position at this moment and is then lowered to depress the tire (22) from above.

Under these circumstances the tire (22) is seized completely between the upper and lower arms (16) and (21) and elevated upon downward movement of the elevating cylinder (12) as is. It will be noted that the tire (22) describes an "L" shaped trajectory while being continuously held in a horizontal position.

The tire (22) is moved backward (in a direction remote from the center of the molds) by the feeder (4) while being held in the same elevated position. When approaching the conveyer (23) the tire (22) is lowered by the elevating cylinder (12). The tire (22) is held in a horizontal direction and continuously sandwiched during the lowering course and is eventually freed from the sandwiched state at nearly the lowest position thereof.

When the support arm (16) reaches the lowest position thereof, the tire is mounted on the conveyer (23) which is located in the lowering course of the support arm (16), and then transferred to the post inflator through conveyer (24).

In this way, tire (22) is unloaded and conveyed while following a ↑⇌↓ shaped travel pattern. Since the tire is always held in a horizontal position during transportation, it is possible to lead the tire to the post inflator without disturbance of the movement for unloading of the tire (22), whether or not lightweight tires such as radial tires are involved. Accordingly, the post inflator performs smoothly and provides stable operation without deviation of the center. In particular, the above discussed traffic pattern by which the tire (22) is brought as close to the post inflator as possible is rather advantageous in minimizing disturbing movements and effectively allowing a space within the molds to be utilized for next vulcanization step.

It is also possible that the horizontal and vertical cylinders (4) and (12) may operate in combination to follow a slant returning trajectory after the tire (22) is elevated. In this case the tire (22) is held in a horizontal position.

As stated previously, according to the present invention, the tire is held consistently in a horizontal position during a period of time from unloading to conveyance and then brought more closely to the next step, thus avoiding problems with differences in positioning, etc., in removing the tire and ensuring stable conveyance to the next step. Automation of these devices is possible and easily accomplished. More particularly, the provision of the pressure arm assures a higher degree of stability than previously obtainable.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for unloading a tire from a tire vulcanizer having a bladder centering mechanism, comprising:
   using said bladder centering mechanism to engage and vertically raise said tire from a mold portion of said vulcanizer;
   advancing a pair of tire support arms in a horizontal direction to a position proximate to and beneath the bottom of said tire;
   raising said tire support arms to a point above said centering mechanism; and
   transferring said tire to a further process;
   wherein said tire is maintained in a horizontal orientation during all of said advancing, raising and transferring steps.

2. The method of claim 1 including the steps of advancing a tire pressing means to a position proximate to the top of said tire, and moving one of said tire support arms and said tire pressing means toward the other of said tire support arms and tire pressing means so as to securely hold said tire therebetween, said tire pressing means advancing step and said moving step preceding said raising step, wherein said tire is securely held between said tire support arms and said tire pressing means during said raising and transferring steps.

3. A tire unloading device in a tire vulcanizer, comprising:
   a base;
   upper and lower molds on said base;
   a centering mechanism, having a bladder, operatively associated with said upper and lower molds;
   feeder means movably supported by said base for reciprocating in a horizontal direction between the center of said molds and a position remote therefrom;
   at least one horizontal tire support arm movably supported by said feeder means; and
   elevator means mounted on said feeder means for vertically moving said tire support arm;
   whereby a tire can be selectively supported, raised and moved horizontally by said horizontal support arm.

4. The device of claim 3 wherein said at least one support arm comprises a pair of support arms.

5. The device of claim 3 including:
   at least one tire pressing arm movably supported by said feeder means and vertically moved by said elevator means; and
   means for moving said tire pressing arm toward and away from said tire support arm, whereby said tire is held between said support arm and said pressing arm.

* * * * *

UNITED STATES PATENT AND TRADEMARK OFFICE
CERTIFICATE OF CORRECTION

PATENT NO. : 4,385,027
DATED : May 24, 1983
INVENTOR(S) : KAZUHIKO NAKAGAWA ET AL.

It is certified that error appears in the above-identified patent and that said Letters Patent is hereby corrected as shown below:

In the Abstract, line 3, delete "tires" before "withdrawn" and insert therefore --tire is--;

In column 1, line 6, insert "." before "This";

In column 1, line 54, insert "of" after "steps";

In column 2, line 10, insert "a" before "face-to-face".

Signed and Sealed this

Thirtieth Day of August 1983

[SEAL]

Attest:

*Attesting Officer*

GERALD J. MOSSINGHOFF

*Commissioner of Patents and Trademarks*